United States Patent
Rogers et al.

(10) Patent No.: US 11,879,340 B1
(45) Date of Patent: Jan. 23, 2024

(54) ANGLED BRUSH SEAL AND GAS TURBINE ENGINE COMPONENT COMBINATION

(71) Applicant: Raytheon Technologies Corporation, Farmington, CT (US)

(72) Inventors: Daniel S. Rogers, Lyman, ME (US); Timothy J. Harding, Wethersfield, CT (US); Joseph Micucci, Scarborough, ME (US); Paul M. Lutjen, Kennebunkport, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/957,438

(22) Filed: Sep. 30, 2022

(51) Int. Cl.
*F01D 11/12* (2006.01)
*F01D 25/00* (2006.01)

(52) U.S. Cl.
CPC ............ *F01D 11/12* (2013.01); *F01D 25/005* (2013.01); *F05D 2240/56* (2013.01); *F05D 2250/38* (2013.01); *F05D 2260/30* (2013.01); *F05D 2300/6033* (2013.01)

(58) Field of Classification Search
CPC ...... F01D 11/12; F01D 11/122; F01D 11/125; F01D 11/127; F05D 2240/56; F05D 2250/38
See application file for complete search history.

(56) References Cited

U.S. PATENT DOCUMENTS

| | | | |
|---|---|---|---|
| 4,411,594 A | 10/1983 | Pellow et al. | |
| 4,732,534 A | 3/1988 | Hanser | |
| 5,074,748 A | 12/1991 | Hagle | |
| 10,400,896 B2 * | 9/2019 | Davis | F01D 11/005 |
| 11,125,096 B2 | 9/2021 | Clark et al. | |
| 11,261,971 B2 * | 3/2022 | Barker | F01D 11/001 |
| 2016/0312637 A1 * | 10/2016 | Duguay | F16J 15/3288 |

FOREIGN PATENT DOCUMENTS

| | | |
|---|---|---|
| EP | 3650657 A1 | 5/2020 |
| EP | 4086433 A1 | 11/2022 |

OTHER PUBLICATIONS

European Search Report for EP Application No. 23201291.4 dated Nov. 24, 2023.

* cited by examiner

*Primary Examiner* — Brian O Peters
(74) *Attorney, Agent, or Firm* — Carlson, Gaskey & Olds, P.C.

(57) ABSTRACT

There is a blade outer air seal positioned to be radially outward of blades in the rotating blade row relative to the rotational axis. There is at least one brush seal having bristles extending from a mount location radially inward to contact a sealing surface on the blade outer air seal. An angle is defined between the bristles and relative to the sealing surface having a radially inward extending component, and with an axial component in a direction toward a leading edge attachment feature and a trailing edge attachment feature, and the angle is less than 90° on a side of the brush seal opposite the leading edge and trailing edge mount hooks. A gas turbine engine component is also disclosed.

20 Claims, 3 Drawing Sheets

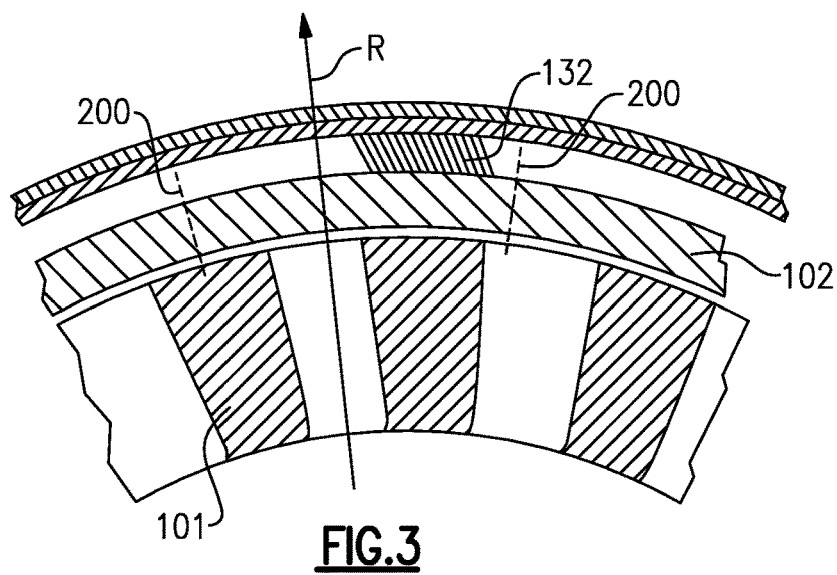
FIG.3
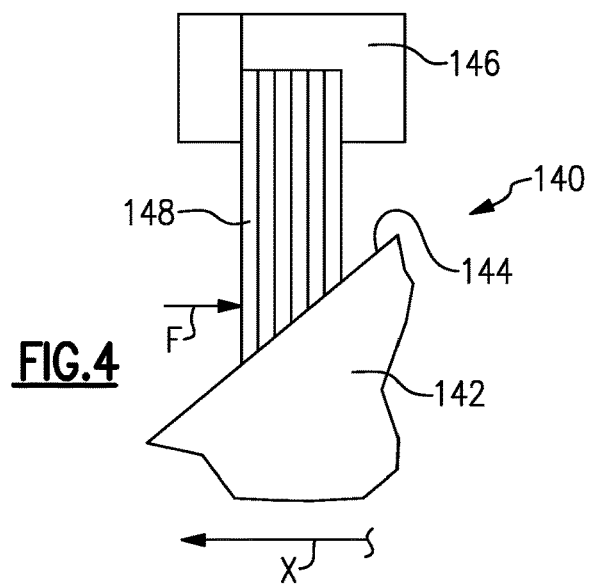
FIG.4
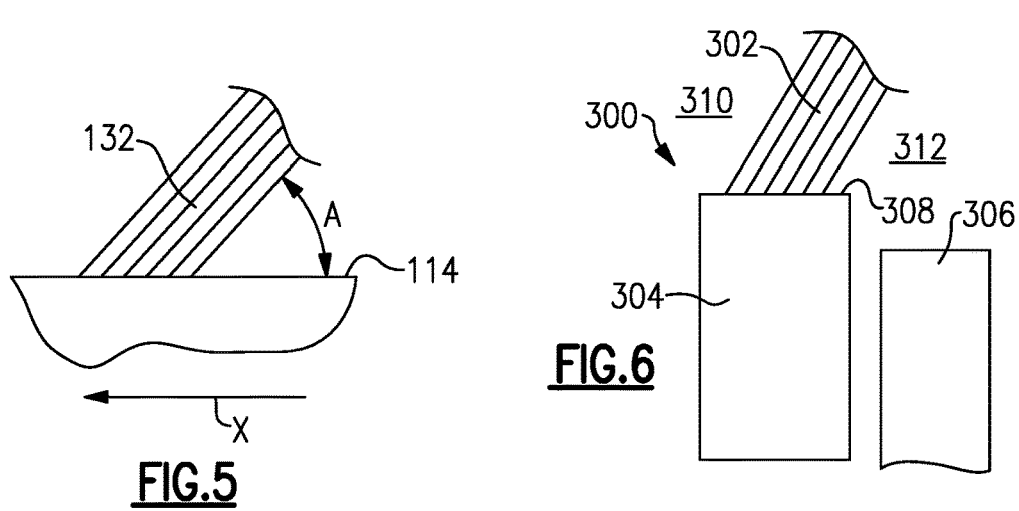
FIG.5
FIG.6

ANGLED BRUSH SEAL AND GAS TURBINE ENGINE COMPONENT COMBINATION

BACKGROUND OF THE INVENTION

This application relates to a brush seal positioned relative to a gas turbine engine component to account for a pressure differential across the brush seal.

Gas turbine engines are known, and typically include a fan delivering air into a bypass duct as propulsion air. The air is also delivered into a compressor where it is compressed. The compressed air is delivered into a combustor where it is mixed with fuel and ignited. Products of this combustion pass downstream over turbine rotors, driving them to rotate. The turbine rotors in turn drive compressor and fan rotors.

As known, the turbine sees very high temperatures from the products of combustion. As such, it has been proposed to use ceramic matrix composites ("CMC") for various components as they are better able to withstand high temperature.

It is also desirable to ensure that the great bulk of the products of combustion pass over blades on the turbine rotors to drive them to rotate. This improves the efficiency. Thus, it is known to provide seals to limit leakage around the turbine blades.

One component which is often provided to limit leakage is a blade outer air seal ("BOAS"). The blade outer air seal is positioned radially outwardly of a tip of a turbine blade. Typically, a blade outer air seal has a leading edge mount hook and a trailing edge mount hook.

A chamber is defined between the two mount hooks. Cooling air is directed into this chamber, and typically from a compressor associated with the gas turbine engine. This cooling air is at a relatively higher pressure, and at a high pressure than the products of combustion. As such, there is a tendency for the high pressure cooling air to leak around the BOAS and into the products of combustion. This creates inefficiencies and it is undesirable.

Thus, it is known to provide brush seals between a static housing and a radially outer or back side of the blade outer air seal to limit this leakage.

In general, the brush seal has extended radially inwardly with only a tangential angle to prevent buckling, and axially perpendicular to a rotational axis of the engine to contact the back of the blade outer air seal.

Static turbine vanes are also positioned intermediate turbine blade rows. It is known to provide brush seals on such vanes.

In at least one known prior art vane, a back surface of the vane was formed at a non-parallel angle relative to the rotational axis of the associated engine. In this vane, a brush seal extended radially inwardly at an angle that was not perpendicular to the rotational axis. In the location where the brush seal contacted the back surface of the vane, the brush seal was essentially at a perpendicular angle relative to the back surface.

In another prior art arrangement the brush seal extended radially inwardly with an axial component in a downstream direction.

SUMMARY OF THE INVENTION

In a featured embodiment, a gas turbine engine includes a compressor section for receiving air and delivering it to a combustor. A turbine section is downstream of the combustor. An upstream location leads from the compressor section in a downstream direction toward the turbine section rotational axis. The turbine section includes at least one rotating blade row for rotation about a rotational axis. There is a blade outer air seal positioned to be radially outward of blades in the rotating blade row relative to the rotational axis. The blade outer air seal has a radially inward facing web spaced from a radially outer tip of the turbine blades, and a radially outer face of the blade outer air seal relative to the radially inward facing web. The blade outer air seal has a leading edge attachment feature adjacent an upstream leading edge of the blade outer air seal and a trailing edge attachment feature adjacent a downstream trailing edge of the blade outer air seal. There is at least one brush seal having bristles extending from a mount location radially inward to contact a sealing surface on the radially outer face. There is a chamber defined between the leading edge attachment feature and the trailing edge attachment feature, and adapted to be connected to a source of pressurized cooling air. An angle is defined between the bristles and relative to the sealing surface having a radially inward extending component, and with an axial component in a direction toward the leading edge attachment feature and the trailing edge attachment feature, and the angle is less than 90° on a side of the brush seal opposite the leading edge and trailing edge attachment features.

In another embodiment according to the previous embodiment, the angle is between 15 and 75 degrees.

In another embodiment according to any of the previous embodiments, the sealing surface is defined downstream of the trailing edge attachment feature, and upstream of the trailing edge with the axial component being towards the trailing edge attachment feature such that the angle is on a downstream side of the bristles.

In another embodiment according to any of the previous embodiments, there is a second of the brush seals, with a second of the sealing surfaces defined upstream of the leading edge attachment feature, and downstream of the leading edge, with the axial component being toward the leading edge attachment feature such that the angle is on an upstream side of the bristles.

In another embodiment according to any of the previous embodiments, the sealing surface is defined upstream of the leading edge attachment feature, and downstream of the leading edge, with the axial component being toward the leading edge attachment feature such that the angle is on an upstream side of the bristles.

In another embodiment according to any of the previous embodiments, a circumferential direction is defined for 360 degrees about the rotational axis. The bristles are wire bristles which are circumferential positioned at a non-parallel angle relative to a radial direction extending outwardly from the axis of rotation.

In another embodiment according to any of the previous embodiments, the sealing surface is generally parallel to the rotational axis.

In another embodiment according to any of the previous embodiments, the sealing surface extends at an angle which is non-parallel to the rotational axis.

In another embodiment according to any of the previous embodiments, the bristles are mounted to extend generally radially inwardly relative to the rotational axis to contact the sealing surface and define the angle.

In another embodiment according to any of the previous embodiments, the sealing surface is defined downstream of the trailing edge attachment feature, and upstream of the trailing edge with the axial component being towards the trailing edge attachment feature such that the angle is on a downstream side of the bristles.

In another embodiment according to any of the previous embodiments, the sealing surface is defined upstream of the leading edge attachment feature, and downstream of the leading edge, with the axial component being toward the leading edge attachment feature such that the angle is on an upstream side of the bristles.

In another embodiment according to any of the previous embodiments, the blade outer air seal is formed of ceramic matrix composites.

In another featured embodiment, a gas turbine engine component includes a component body to be positioned in a turbine section of an engine having a rotational axis. The component body has a radially outer face defining a sealing surface. There is at least one brush seal having bristles extending from a mount location radially outward of the sealing surface to contact the sealing surface. The bristles extend radially inwardly to seal between a first higher pressure chamber and a second lower pressure chamber. The bristles define an angle with the sealing surface having an axial component extending in a direction toward the higher pressure chamber. The angle is less than 90° on a side of the brush seal on second lower pressure side of the bristles. The component body is formed of ceramic matrix components.

In another embodiment according to any of the previous embodiments, the angle is between 15 and 75 degrees.

In another embodiment according to any of the previous embodiments, the component body is a blade outer air seal.

In another embodiment according to any of the previous embodiments, the blade outer air seal has a leading edge mount hook adjacent an upstream leading edge of the blade outer air seal and a trailing edge mount hook adjacent a downstream trailing edge of the blade outer air seal.

In another embodiment according to any of the previous embodiments, the sealing surface is defined downstream of the trailing edge mount hook, and upstream of the trailing edge.

In another embodiment according to any of the previous embodiments, the sealing surface is generally parallel to the rotational axis.

In another embodiment according to any of the previous embodiments, the sealing surface extends at an angle which is non-parallel to the rotational axis. The bristles are mounted to extend generally radially inwardly to contact the sealing surface relative to the rotational axis.

In another embodiment according to any of the previous embodiments, the component body is a static vane.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 3 is a cross-sectional view along line 3-3 as shown in FIG. 2B.
FIG. 4 shows a distinct embodiment of a brush seal.
FIG. 5 shows a detail of the interface between a brush seal and a blade outer air seal surface.
FIG. 6 shows another brush seal application.

DETAILED DESCRIPTION

Figure 1:
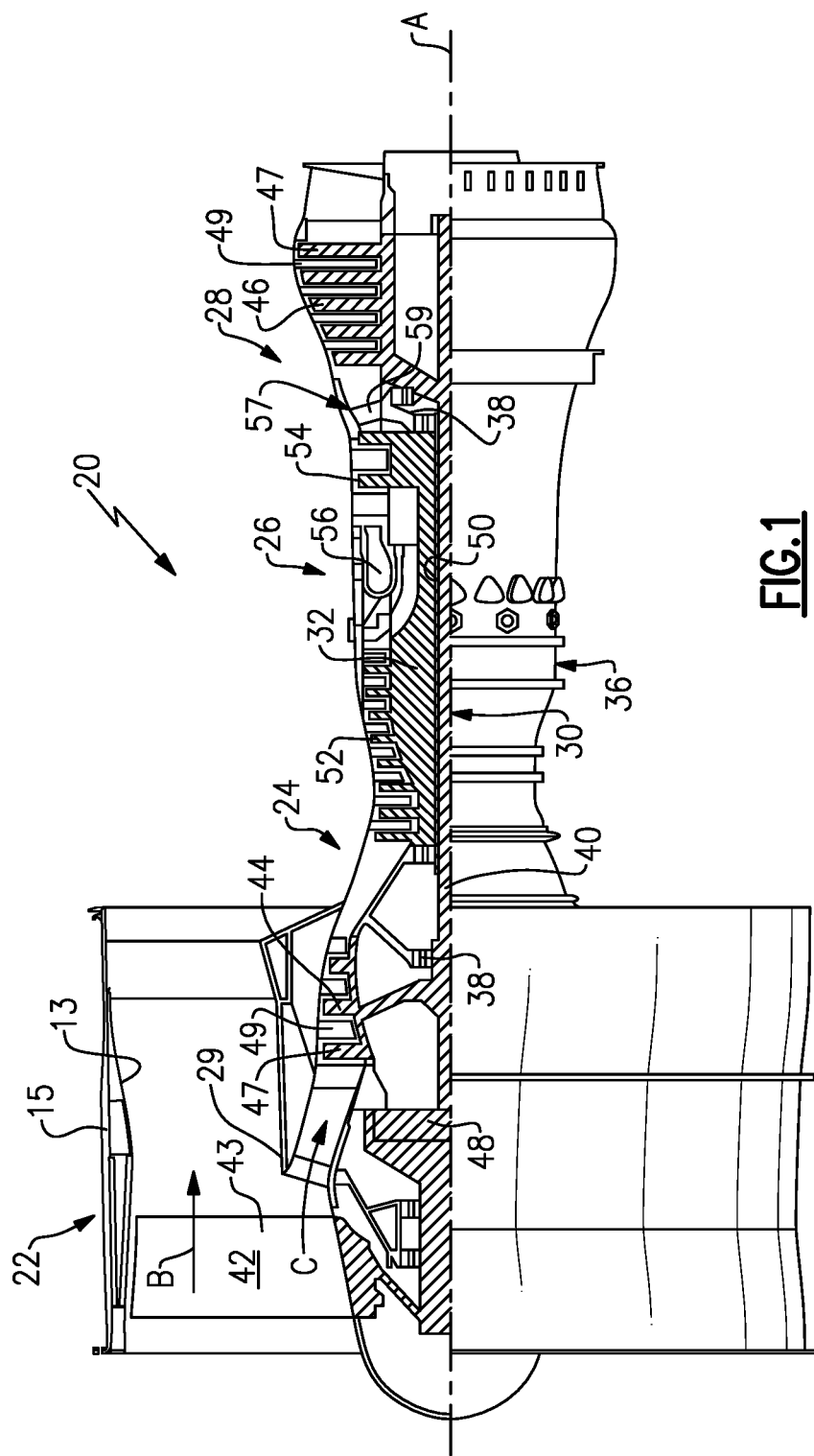
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram} \,^\circ \text{R})/(518.7^\circ \text{R})]^{0.5}$. The corrected fan tip speed can be less than or equal to 1150.0 ft/second (350.5 meters/second), and can be greater than or equal to 1000.0 ft/second (304.8 meters/second).

Figure 2A:
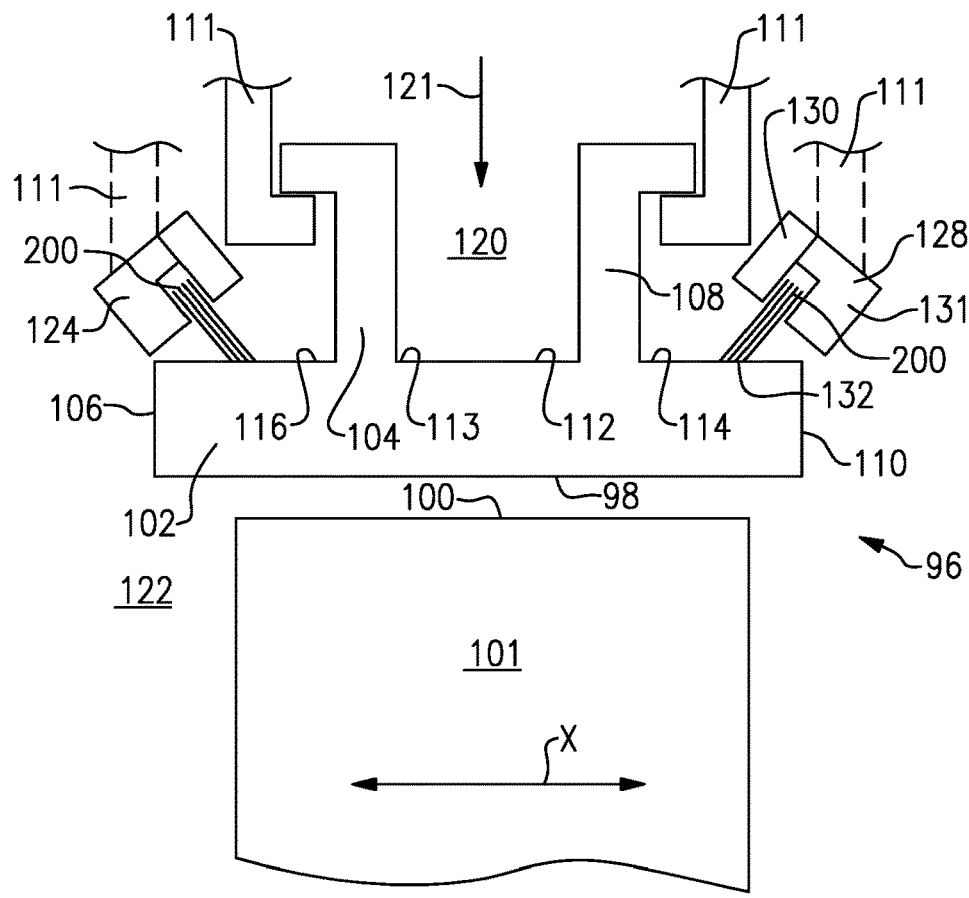
FIG. 2A shows a turbine section in the gas turbine engine of FIG. 1.

FIG. 2A shows a portion of a turbine section 96. A blade outer air seal 102 has a radially inward facing surface 98 closely spaced from a radially outer tip 100 of a rotating turbine blade 101.

The blade outer air seal 102 has a leading edge mount hook 104 associated with a leading edge 106. The blade outer air seal 102 also has a trailing edge mount hook 108 associated with a trailing edge 110.

As is known, products of combustion pass across the turbine blade 101 from its leading edge 106, or an upstream location toward the trailing edge 110 or downstream. The blade outer air seal 102 serves to limit leakage of the products of combustion around the turbine blade 101.

There is a face 113 on a radial side of the blade outer air seal 102 that is remote from the face 98. The face 113 has a surface 112 between the mount hooks 104 and 108. There is also a surface 114 which is between the trailing edge mount hook 108 and the trailing edge 110. Similarly, there is a surface 116 between the leading edge mount hook 104 and the leading edge 106. The blade outer air seal 102 is mounted on mount structure 111, shown schematically.

As shown, a source 121, which may be tapped from a compressor associated with the gas turbine engine such as shown in FIG. 1, communicates high pressure cooling air into a chamber 120 defined between the leading edge mount hook 104 and the trailing edge mount hook 108. Typically, the cooling air flows into a cooling circuit in a body of the blade outer air seal. This high pressure cooling air is at a higher pressure than the products of combustion in a chamber 122. As such, there is a tendency for the high pressure cooling air to leak around the hooks 104 and 108 and mix into the products of combustion 122. This would be inefficient.

While mount hooks are disclosed, blade outer air seals having other types of attachment features would benefit from the teaching of this disclosure. As other examples the attachment features could be flanges of dovetail joints.

As such, it is known to mount brush seals to resist that leakage flow. As shown in FIG. 2A, there is a first brush seal 124 located to seal on the surface 116. There is a second brush seal 128 to seal on the surface 114. As shown, the seals 128/124 have a housing 130 and 131 which is formed of two pieces to mount a plurality of brush bristles 132, or bristle pack. Mount structure 111 is shown schematically mounting the brush seals 124 and 128. As can be appreciated, the brush bristles have a first end that is in contact with the sealing surfaces 114 or 116 and a second end 200 that is secured within the housing 130 and 131.

While two brush seals are shown at two distinct locations, embodiments having only a single brush seal at either of these locations may benefit from this disclosure. Further, additional brush seals may be utilized if indicated.

Figure 2B:
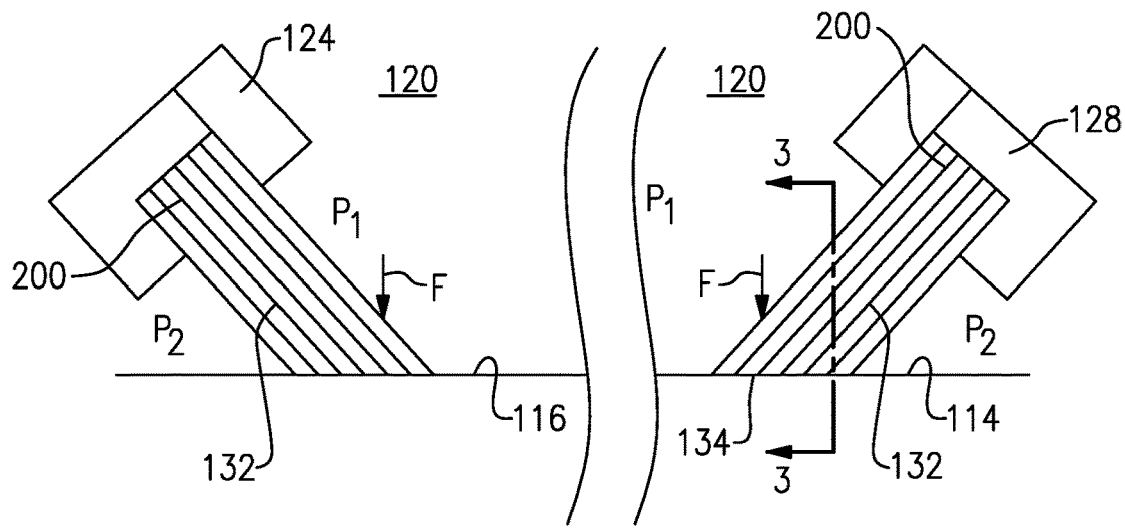
FIG. 2B shows a detail of a brush seal incorporated into the FIG. 2A turbine section

As shown in FIG. 2B, the bristles 132 extend to a tip 134 which is in contact with the surfaces 114 and 116. As illustrated, and as will be explained below, the bristles 132 are not perpendicular to the surface 114, but rather extend along a direction that includes a component extending toward the leading edge 106 and having a component extending radially inwardly when extending from the mount toward the blade outer air seal surface 114 that contacts bristles 132. Due to this, a pressure differential between a pressure $P_1$ found in the chamber 120, compared to the pressure $P_2$ found in the chamber 122, forces F the bristles 132 against the surface 114. In prior art blade seals wherein the bristles extend generally perpendicular to the sealing surface, the bristles might be forced to bend inwardly, and toward the trailing edge 110, allowing leakage.

As shown, the leading edge brush seal 124 is at an angle which is generally opposed to the angle of the trailing edge brush seal 128. Still, there is a high pressure P1 from the chamber 120 that will force the bristles 132 against the surface 116 relative to pressure P2 in chamber 122.

It could be said that the bristles extend radially inwardly from a mount location and with an axial component from the surfaces 114 and 116, and in a direction towards the mount hooks to define an angle on a side of the brush seals 124 and 128 opposite the mount hooks 104/108 wherein the angle is less than 90°.

FIG. 3 is a view along line 3-3, and shows the bristles 132 are angled with a circumferential component as they extend around the circumference of the blade outer air seal 102. Further, the blade outer air seal 102 may be formed by a plurality of distinct segments, as is illustrated schematically by the dashed lines 200. It is preferable that the brush seal extends across the entirety of 360 degrees relative to a rotational axis X of the gas turbine engine.

FIG. 4 shows an embodiment 140 wherein a blade outer air seal 146 has its bristles 148 extending generally perpendicularly relative to a rotational axis X. However, the blade outer air seal 142 has its sealing surface 144 formed at a non-parallel angle relative to the rotational axis X. Here again, when the pressure differential across the blade outer air seals acts against the bristles, they will be forced into contact with the surface 144. The illustrated embodiment is downstream of the trailing edge mount hook, such that there is an included angle between bristles 148 and surface 144 that is less than 90°.

FIG. 5 shows the angle A between the bristles 132 and the surface 114. This would be true of all of the brush seal locations 124, 128 and the relationship as shown in the embodiment 140 of FIG. 4. In embodiments, the angle A is preferably between 15° and 75°. In further embodiments, the angle A is between 35° and 55°.

FIG. 6 shows an alternative application 300 wherein the component contacting the brush seal 302 is a stator vane 304 which is positioned intermediate rotating turbine blade rows 306 that is less than 90°. The bristles in the brush seal 302 are again at an angle relative to a sealing surface 308 on the stator vane 304. This embodiment would incorporate the features as set forth above.

In this embodiment, a chamber 310 contains gasses at a higher pressure than a chamber 312.

Generically, it could be said that the embodiments of FIGS. 2A, 2B and 4-6 all have a brush seal with bristles extending radially inwardly to seal between a first higher pressure chamber and a second lower pressure chamber, and the bristles defining an angle with a sealing surface having an axial component extending in a direction toward the higher pressure chamber.

This particular disclosure is especially powerful when utilized with components formed of ceramic matrix composites. In manufacturing components from ceramic matrix composites it is sometimes difficult to form a very smooth sealing surface. The additional sealing contact supplied by the pressure differential will thus allow the bristles in the several seals to better provide a seal on the sealing surface.

In embodiments, the ceramic matrix components could be formed of CMC material or a monolithic ceramic. A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcement and is formed of a single material. Example monolithic ceramics include silicon-containing ceramics, such as silicon carbide (SiC) or silicon nitride (Si3N4).

A gas turbine engine under this disclosure could be said to include a compressor section for receiving air and delivering it to a combustor, a turbine section downstream of the combustor. An upstream location is defined leading from the compressor section in a downstream direction toward the turbine section. The turbine section is for rotation about a rotational axis. The turbine section includes at least one rotating blade row. There is a blade outer air seal positioned to be radially outward of blades in the rotating blade row relative to the rotational axis. The blade outer air seal has a radially inward facing web spaced from a radially outer tip of the turbine blades, and a radially outer face of the blade outer air seal relative to the radially inward facing web. The blade outer air seal has a leading edge attachment feature adjacent an upstream leading edge of the blade outer air seal and a trailing edge attachment feature adjacent a downstream trailing edge of the blade outer air seal. There is at least one brush seal having bristles extending from a mount location radially inward to contact a sealing surface on the radially outer face. There is a chamber defined between the leading edge attachment feature and the trailing edge attachment feature, and adapted to be connected to a source of pressurized cooling air. An angle is defined between the bristles and relative to the sealing surface having a radially inward extending component, and with an axial component in a direction toward the leading edge attachment feature and the trailing edge attachment feature and the angle is less than 90° on a side of the brush seal opposite the leading edge and trailing edge attachment features.

A gas turbine engine component under this disclosure could also be said to include a component body to be positioned in a turbine section of an engine having a rotational axis. The component body has a radially outer face defining a sealing surface. There is at least one brush seal having bristles extending from a mount location radially outward of the sealing surface to contact the sealing surface. A brush seal has bristles which extend radially inwardly to seal between a first higher pressure chamber and a second lower pressure chamber. The bristles define an angle with a sealing surface having an axial component extending in a direction toward the higher pressure chamber. The angle is less than 90° on the second lower pressure chamber side of the bristles. The component body is formed of ceramic matrix components.

Although embodiments have been disclosed, a worker of ordinary skill in this art would recognize that modifications would come within the scope of this disclosure. For that reason, the following claims should be studied to determine the true scope and content of this disclosure.

What is claimed is:

1. A gas turbine engine comprising:
a compressor section for receiving air and delivering it to a combustor;
a turbine section downstream of said combustor, an upstream location leading from the compressor section in a downstream direction toward the turbine section rotational axis;
the turbine section including at least one rotating blade row for rotation about a rotational axis, and there being a blade outer air seal positioned to be radially outward of blades in the rotating blade row relative to the rotational axis, the blade outer air seal having a radially inward facing web spaced from a radially outer tip of the turbine blades, and a radially outer face of said blade outer air seal relative to said radially inward facing web, wherein said blade outer air seal having a leading edge attachment feature adjacent an upstream leading edge of the blade outer air seal and a trailing edge attachment feature adjacent a downstream trailing edge of the blade outer air seal;
there being at least one brush seal having bristles extending from a mount location radially inward to contact a sealing surface on the radially outer face, there being a chamber defined between said leading edge attachment feature and said trailing edge attachment feature, and adapted to be connected to a source of pressurized cooling air, with an angle defined between said bristles and relative to said sealing surface having a radially inward extending component, and with an axial component in a direction toward said leading edge attachment feature and said trailing edge attachment feature, and the angle is less than 90° on a side of the brush seal opposite the leading edge and trailing edge attachment features; and
the bristles having a first end in contact with said sealing surface and a second end mounted in a housing to define the mount location.

2. The gas turbine engine as set forth in claim 1, wherein said angle is between 15 and 75 degrees.

3. The gas turbine engine as set forth in claim 2, wherein said sealing surface being defined downstream of said trailing edge attachment feature, and upstream of said trailing edge with said axial component being towards said trailing edge attachment feature such that said angle is on a downstream side of said bristles.

4. The gas turbine engine as set forth in claim 3, wherein there is a second of said brush seals, with a second of said sealing surfaces defined upstream of said leading edge attachment feature, and downstream of said leading edge, with said axial component being toward said leading edge attachment feature such that said angle is on an upstream side of said bristles.

5. The gas turbine engine as set forth in claim 2, wherein said sealing surface being defined upstream of said leading edge attachment feature, and downstream of said leading edge, with said axial component being toward said leading edge attachment feature such that said angle is on an upstream side of said bristles.

6. The gas turbine engine as set forth in claim 1, wherein a circumferential direction is defined for 360 degrees about the rotational axis, and said bristles being wire bristles which are circumferential positioned at a non-parallel angle relative to a radial direction extending outwardly from said axis of rotation.

7. The gas turbine engine as set forth in claim 1, wherein said sealing surface is generally parallel to the rotational axis.

8. A gas turbine engine comprising:
a compressor section for receiving air and delivering it to a combustor;
a turbine section downstream of said combustor, an upstream location leading from the compressor section in a downstream direction toward the turbine section rotational axis;
the turbine section including at least one rotating blade row for rotation about a rotational axis, and there being a blade outer air seal positioned to be radially outward of blades in the rotating blade row relative to the rotational axis, the blade outer air seal having a radially inward facing web spaced from a radially outer tip of the turbine blades, and a radially outer face of said blade outer air seal relative to said radially inward facing web, wherein said blade outer air seal having a leading edge attachment feature adjacent an upstream leading edge of the blade outer air seal and a trailing edge attachment feature adjacent a downstream trailing edge of the blade outer air seal;
there being at least one brush seal having bristles extending from a mount location radially inward to contact a sealing surface on the radially outer face, there being a chamber defined between said leading edge attachment feature and said trailing edge attachment feature, and adapted to be connected to a source of pressurized cooling air, with an angle defined between said bristles and relative to said sealing surface having a radially inward extending component, and with an axial component in a direction toward said leading edge attachment feature and said trailing edge attachment feature, and the angle is less than 90° on a side of the brush seal opposite the leading edge and trailing edge attachment features; and
wherein said sealing surface extends at an angle which is non-parallel to the rotational axis.

9. The gas turbine engine as set forth in claim 8, wherein said bristles are mounted to extend generally radially inwardly relative to said rotational axis to contact said sealing surface and define said angle.

10. The gas turbine engine as set forth in claim 1, wherein said sealing surface being defined downstream of said trailing edge attachment feature, and upstream of said trailing edge with said axial component being towards said trailing edge attachment feature such that said angle is on a downstream side of said bristles.

11. The gas turbine engine as set forth in claim 1, wherein said sealing surface being defined upstream of said leading edge attachment feature, and downstream of said leading edge, with said axial component being toward said leading edge attachment feature such that said angle is on an upstream side of said bristles.

12. The gas turbine engine as set forth in claim 1, wherein the blade outer air seal is formed of ceramic matrix composites.

13. A gas turbine engine component comprising:
a component body to be positioned in a turbine section of an engine having a rotational axis, the component body having a radially outer face defining a sealing surface, and there being at least one brush seal having bristles extending from a mount location radially outward of said sealing surface to contact said sealing surface, said bristles which extend radially inwardly to seal between a first higher pressure chamber and a second lower pressure chamber, and the bristles defining an angle with the sealing surface having an axial component extending in a direction toward the higher pressure chamber, and the angle is less than 90° on a side of the brush seal on second lower pressure side of the bristles;
wherein the component body is formed of ceramic matrix components; and
the bristles having a first end in contact with said sealing surface and a second end mounted in a housing to define the mount location.

14. The component as set forth in claim 13, wherein said angle is between 15 and 75 degrees.

15. The component as set forth in claim 13, wherein said component body is a blade outer air seal.

16. The component as set forth in claim 15, wherein said blade outer air seal having a leading edge mount hook adjacent an upstream leading edge of the blade outer air seal and a trailing edge mount hook adjacent a downstream trailing edge of the blade outer air seal.

17. The component as set forth in claim 16, wherein said sealing surface being defined downstream of said trailing edge mount hook, and upstream of said trailing edge.

18. The component as set forth in claim 13, wherein said sealing surface is generally parallel to the rotational axis.

19. The component as set forth in claim 13, wherein said sealing surface is extending at an angle which is non-parallel to said rotational axis, wherein said bristles are mounted to extend generally radially inwardly to contact said sealing surface relative to said rotational axis.

20. The component as set forth in claim 13, wherein said component body is a static vane.

* * * * *